US010899982B2

(12) United States Patent
Tian et al.

(10) Patent No.: US 10,899,982 B2
(45) Date of Patent: Jan. 26, 2021

(54) INTEGRATED COAL GASIFICATION COMBINED POWER GENERATION PROCESS WITH ZERO CARBON EMISSION

(71) Applicant: China University of Petroleum (East China), Qingdao (CN)

(72) Inventors: Yuanyu Tian, Qingdao (CN); Yingyun Qiao, Qingdao (CN); Kechang Xie, Qingdao (CN); Lanyi Sun, Qingdao (CN); Fanfan Xu, Qingdao (CN); Xue Ming, Qingdao (CN); Yanpeng Zhang, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 0 days.

(21) Appl. No.: 16/555,164

(22) Filed: Aug. 29, 2019

(65) Prior Publication Data
US 2020/0140770 A1    May 7, 2020

(30) Foreign Application Priority Data
Nov. 2, 2018  (CN) .......................... 2018 1 1300886

(51) Int. Cl.
*C10J 3/62* (2006.01)
*C10J 3/64* (2006.01)

(52) U.S. Cl.
CPC . *C10J 3/62* (2013.01); *C10J 3/64* (2013.01); *C10J 2300/093* (2013.01);
(Continued)

(58) Field of Classification Search
CPC ......... C10J 2300/0913; C10J 3/86; C10J 3/62
See application file for complete search history.

(56) References Cited

U.S. PATENT DOCUMENTS

2002/0166323 A1*  11/2002  Marin .................. F01K 21/047
                                               60/775
2006/0201159 A1*   9/2006  Saulnier ............... F02C 3/30
                                               60/783
(Continued)

*Primary Examiner* — Matthew J Merkling
(74) *Attorney, Agent, or Firm* — Volpe Koenig

(57) ABSTRACT

The present disclosure relates to the technical field of coal chemical industry, and particularly discloses an integrated coal gasification combined power generation process with zero carbon emission, the process comprising: pressurizing air for performing air separation to obtain liquid oxygen and liquid nitrogen, wherein the liquid oxygen is used for gasification and power generation, the liquid nitrogen is applied as the coolant for the gasification and power generation, the liquid nitrogen and a part of liquid oxygen stored during the valley period with low electricity load are provided for use during the peak period with high electricity load; the pulverized coal delivered under pressure and high-pressure oxygen enter a coal gasification furnace for gasification, so as to generate high-temperature fuel gas, which subjects to heat exchange and purification, and then the high-pressure fuel gas enters into a combustion gas turbine along with oxygen and recyclable $CO_2$ for burning and driving an air compressor and a generator to rotate at a high speed; the air compressor compresses the air to a pressure of 0.4~0.8 MPa, and the generator generates electricity; the high-temperature combustion flue gas performs the supercritical $CO_2$ power generation, its coolant is liquid oxygen or liquid nitrogen; the heat exchanged combustion fuel gas subsequently perform heat exchange with liquid nitrogen, the liquid nitrogen vaporizes to drive a nitrogen turbine generator for generating electricity, the cooled flue gas is dehydrated and distilled to separate $CO_2$, a part of $CO_2$ is used for circulation and temperature control, and another portion of $CO_2$ is sold outward as liquid $CO_2$ product. The power generation process provided by the present disclosure not only solves the difficult problems of high water con-
(Continued)

sumption, low power generation efficiency and small range of peak load adjustment capacity of the existing IGCC technology; but also can compress air with high unit volume for energy storage with a high conversion efficiency, and greatly reduce load of the air compressor, thereby perform $CO_2$ capture and utilization with low-cost, zero $NO_x$ emission and discharging fuel gas at a normal temperature, and significantly improve the power generation efficiency.

14 Claims, 1 Drawing Sheet

(52) U.S. Cl.
CPC .. *C10J 2300/165* (2013.01); *C10J 2300/1612* (2013.01); *C10J 2300/1675* (2013.01)

(56) References Cited

U.S. PATENT DOCUMENTS

| | | | |
|---|---|---|---|
| 2011/0226010 A1* | 9/2011 | Baxter | F02C 6/16 |
| | | | 62/619 |
| 2012/0056431 A1* | 3/2012 | Bland | C10L 5/366 |
| | | | 290/52 |
| 2012/0167577 A1* | 7/2012 | Pemmi | F02C 3/20 |
| | | | 60/772 |
| 2013/0205746 A1* | 8/2013 | Allam | F02C 3/34 |
| | | | 60/39.12 |
| 2019/0024583 A1* | 1/2019 | Lu | F02C 7/08 |

* cited by examiner

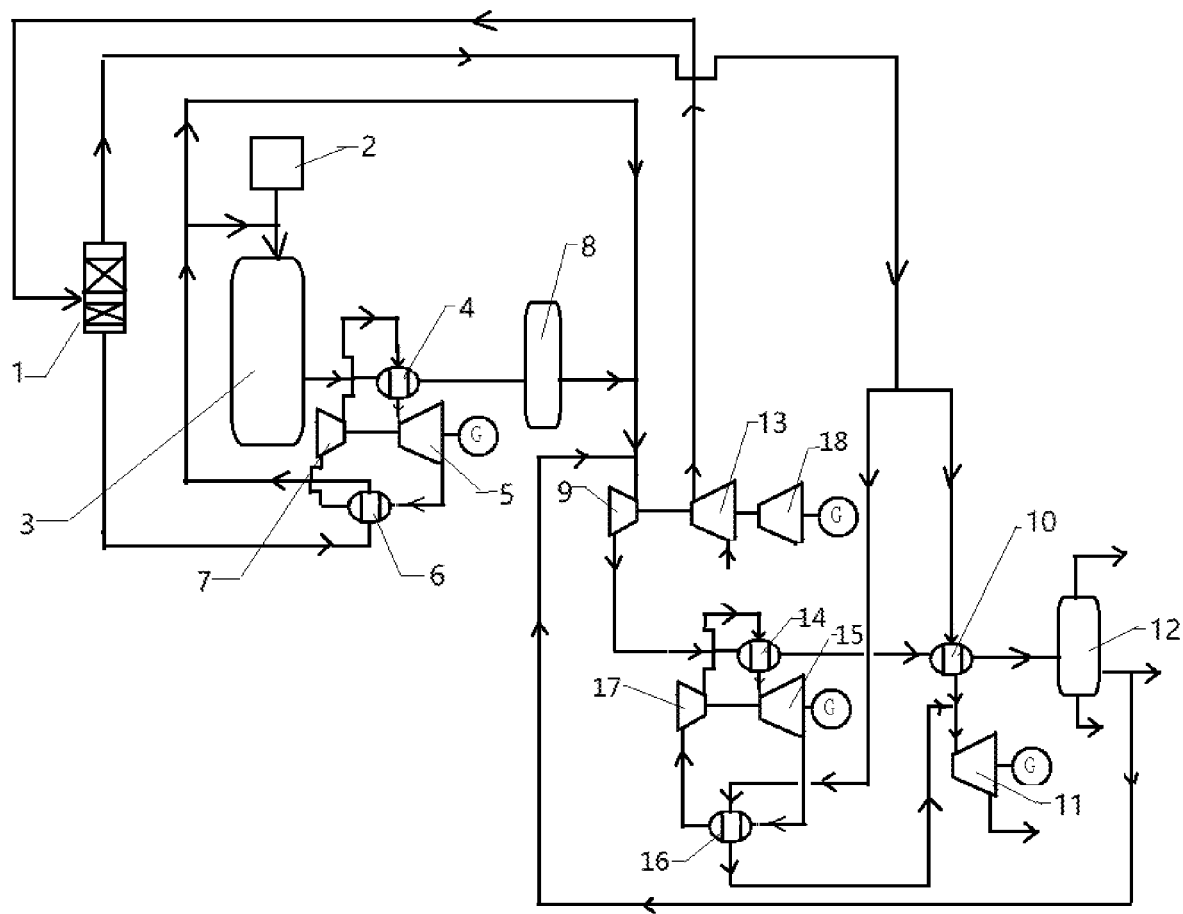

INTEGRATED COAL GASIFICATION COMBINED POWER GENERATION PROCESS WITH ZERO CARBON EMISSION

CROSS REFERENCE TO RELATED APPLICATIONS

The application claims priority to Chinese Application No. 201811300886.6, filed on Nov. 2, 2018, entitled "An Integrated Coal Gasification Combined Power Generation Process with Zero Carbon Emission for Peak Shaving", which is specifically and entirely incorporated herein by reference.

FIELD

The present disclosure relates to the technical field of coal chemical industry, and particularly discloses an integrated coal gasification combined power generation process with zero carbon emission.

BACKGROUND

Coal is a low-cost energy source with high pollution and $CO_2$ emissions. The exploit of efficient, clean and low carbon emissions technology for coal utilization has been the goal of joint efforts from the national governments and industries around the world.

IGCC (Integrated Gasification Combined Cycle) is a novel power generation system, which combines clean coal gasification technology with a highly efficient fuel gas-steam combined cycle power generation system, the system firstly gasifies coal and then promotes the fuel gas turbine to work, and the system is equipped with a steam turbine to generate electricity with waste heat, it is exactly "a fuel gas power plant using coal as the raw material". Under the current technical level, the net efficiency of IGCC power generation may reach 43%~45%, and the net efficiency is expected to be higher in the future; while the emission of pollutants is only 1/10 of the conventional coal-fired power plant, and the desulfurization efficiency may reach 99%; in addition, the emission of sulfur dioxide is around 25 mg/Nm³, far below the emission standard of 1,200 mg/Nm³, and the emission of nitrogen oxides is only 15%~20% of conventional power plants, and the water consumption merely accounts for 1/2~1/3 of conventional power plants. Therefore, as compared with the traditional coal-fired power technology, IGCC technology integrates the coal gasification and fuel gas-steam combined cycle power generation technology, thus has the advantages of high efficiency of power generation, low emission of pollutants and low cost of carbon dioxide capture, it is currently the most promising clean and efficient coal-fired power technology which has been proven by the international society and can be industrialize.

The traditional IGCC system consists of two parts, namely the coal gasification and purification part, and the fuel gas-steam combined cycle power generation part. The key devices of the first part include gasification furnace, air separation facility and coal gas purification equipment (including sulfur recovery unit); the key devices of the second part comprise combustion gas turbine power generation system, waste heat boiler and steam turbine power generation system. The general IGCC process is as follows: the coal subjects to gasification and becomes coal gas with medium-low calorific value; the coal gas is purified for removing pollutants such as sulfides, chlorides, dust, heavy metals in the coal gas, and produces a clean gas fuel, and the purified coal gas is then sent conveyed to the combustion chamber of the gas turbine for burning and driving the fuel gas turbine to compress the gas and generate electricity, the exhausted gas from the gas turbine enters the waste heat boiler to heat the feed water, and generate superheated steam to drive the steam turbine to work, and finally the flue gas is emitted at an ultra-low level. Currently, in addition to the five IGCC power plants already built in the United States of America (USA), the Netherlands, the Spain, the Japan and other countries, Tianjin IGCC demonstration power station invested by the China Huaneng Group is the sixth IGCC power station in the world, and the Edwardsport power station in the Indiana State of the USA is the seventh IGCC power station in the world, and the Kemper power station under construction in the Mississippi state of the USA is the eighth IGCC power station. Moreover, there are nearly 20 IGCC units for co-generation.

With the rapid development and mutual promotion of renewable energy and energy storage technologies, the power system evolves towards the diversified smart energy system with a co-existence of large-scale and concentrated power plants and wide distribution in the future; in order to meet the coordinated regulation in response to the climate change and air pollution control, the IGCC basic load power plant utilizing coal as the raw material is mainly used for peak shaving of the power grid, but the existing IGCC technology has the defects such as high cost of $CO_2$ capture and utilization, high water consumption, low power generation efficiency, small range of peak load adjustment capacity, high temperature of the exhaust smoke, and difficult in reducing emission of $NO_x$.

At present, the daily electricity load is fluctuating, and the peak-valley difference is gradually increasing. For the sake of meeting the power demand, the current power generation installed capacity and power grid capacity need to be built according to the maximum demand, resulting in the shutdown of generator set or operation with low load when power consumption is in a valley, as well as waste of the power grid capacity. The energy storage and peak shaving technologies mainly comprise three modes, namely water storage for energy storage, compressed air for energy storage and electricity storage for energy storage. The water storage for energy storage is currently the main mode of large-scale energy storage projects, but it has defects that the projects require a high potential difference, a vast floor space and a large sum of investment. In the field of large-scale energy storage, the compressed air for energy storage is a desirable method of energy storage, which uses air compressors to convert the discarded light source, abandoned wind power, wasted hydropower or low valley electricity into molecular potential energy and store it in a pressurized gas storage device. When it is required to generate electricity, the turbine is driven by the release of high-pressure air to boost one or more generators to generate electricity. However, the compressed air currently studied has defects in three aspects: (1) it relies on fossil fuels such as natural gas to provide a heat source, and is not suitable for countries "lacking oil and gas"; (2) the energy storage capacity per unit volume is small, it requires special geographical conditions to build large gas storage chambers, such as the rock caves, salt caves, abandoned mines and the like with high airtightness; (3) the system efficiency is relatively low (42%~54%), which shall be further improved.

SUMMARY

The objective of the present disclosure is to overcome the deficiencies of the conventional IGCC technologies and provide an integrated coal gasification combined power generation process with zero carbon emission; the power generation process provided by the present disclosure not only solves difficult problems of the existing IGCC technology, such as the high water consumption, low power generation efficiency and small range of peak load adjustment capacity; but also can perform energy storage with high unit volume compressed air, high conversion efficiency; in addition, it may greatly reduce the load of the air compressor, perform $CO_2$ capture and utilization with low-cost, zero $NO_x$ emission and discharging smoke at a normal temperature, improve the power generation efficiency significantly.

The present disclosure provides an integrated coal gasification combined power generation process with zero carbon emission, the process comprising:

1) introducing pressurized air with a pressure 0.4~0.8 MPa into an air separation facility for performing air separation to obtain liquid oxygen and liquid nitrogen;

2) performing heat exchange at a first cooler between at least a part of the liquid oxygen and the high-temperature $CO_2$ from an outlet of a first supercritical $CO_2$ generator, so as to generate high-pressure vaporized oxygen and recyclable $CO_2$;

3) subjecting at least a part of the high-pressure vaporized oxygen and pulverized coal to a gasification reaction in a coal gasification furnace, carrying out heat exchange of the obtained high-temperature and high-pressure fuel gas in a first $CO_2$ waste heat boiler to perform the first supercritical $CO_2$ power generation;

4) purifying the high-pressure fuel gas obtained by the heat exchange in step 3) to obtain the high-pressure purified fuel gas;

5) pumping the remaining part of the high-pressure vaporized oxygen and the high-pressure purified fuel gas jointly into a combustion gas turbine for burning and swelling to drive an air compressor and a generator to generate electricity;

6) subjecting the high-temperature combustion flue gas obtained in step 5) to heat exchange in a second $CO_2$ waste heat boiler to perform a second supercritical $CO_2$ power generation, and the coolant of the second supercritical $CO_2$ power generation is at least part of the liquid oxygen and/or at least part of the liquid nitrogen;

7) performing heat exchange of the heat exchanged combustion flue gas obtained in step 6) with at least part of the liquid nitrogen through a vaporizer, the vaporization of liquid nitrogen drives a nitrogen turbine generator to generate electricity.

The integrated coal gasification combined power generation process with zero carbon emission provided by the present disclosure has the following advantages:
1) The integrated coal gasification combined power generation process with zero carbon emission provided by the present disclosure can shave peak and generate power, the liquid nitrogen and a part of the liquid oxygen separated during the valley period with low electricity load (e.g., at nighttime) can be stored and supplied in use during the peak period with high electricity load (e.g., in the daytime). Specifically, during the peak period of power grid operation with high electricity load during the daytime, the liquid nitrogen stored at nighttime and separated during the daytime is pumped and pressurized, and then subjects to heat exchange and vaporization for power generation; the liquid oxygen stored at nighttime and separated during the daytime is pumped and pressurized, and then subjects to heat exchange and vaporization for use in a coal gasification furnace and a combustion gas turbine to perform peak shaving and power generation in response to the load fluctuation;

2) The present disclosure may improve IGCC power generation efficiency and peak shaving ability by means of coupling a series of technologies, such as using the liquid nitrogen derived from air separation for energy storage, employing the liquid oxygen derived from air separation for coal gasification, and utilizing the high-temperature coal gas and waste heat of high-temperature flue gas for supercritical $CO_2$ power generation, arranging $CO_2$ to return to combustion gas turbine feed for circulation and temperature control, applying the liquid Oxygen as a coolant for supercritical $CO_2$ power generation, using liquid nitrogen as the flue gas coolant for cooling and dehydration in stages, and performing distillation, recovery and purification of the liquid $CO_2$, thereby achieve the clean and efficient coal-fired power generation with zero pollution, low water consumption and zero carbon emissions.

BRIEF DESCRIPTION OF THE DRAWINGS

The drawings provide reference to facilitate further understanding of the present disclosure, and constitute a part of the description, it serves to illustrate the present disclosure along with the following specific embodiments, but the drawings do not impose limitation on the present disclosure. In the drawings:

FIG. 1 is a schematic diagram of an integrated coal gasification combined power generation process with zero carbon emission according to an embodiment of the present disclosure.

DESCRIPTION OF THE REFERENCE SIGNS

| 1. air separation facility | 2. coal bunker | 3. coal gasification furnace |
|---|---|---|
| 4. first $CO_2$ waste heat boiler | 5. first supercritical $CO_2$ generator | 6. first cooler |
| 7. first $CO_2$ compressor | 8. purifier | 9. combustion gas turbine |
| 10. vaporizer | 11. nitrogen turbine generator | 12. flue gas distillation tower |
| 13. air compressor | 14. second $CO_2$ waste heat boiler | 15. second supercritical $CO_2$ generator |
| 16. second cooler | 17. second $CO_2$ compressor | 18. generator |

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

As illustrated in FIG. 1, the present disclosure provides an integrated coal gasification combined power generation process with zero carbon emission, the process comprising:

1) introducing pressurized air with a pressure 0.4~0.8 MPa into an air separation facility for performing air separation to obtain liquid oxygen and liquid nitrogen;

2) performing heat exchange at a first cooler between at least a part of the liquid oxygen and the high-temperature $CO_2$ from an outlet of a first supercritical $CO_2$ generator, so as to generate high-pressure vaporized oxygen and recyclable $CO_2$;

3) subjecting at least a part of the high-pressure vaporized oxygen and pulverized coal to a gasification reaction in a coal gasification furnace, carrying out heat exchange of the obtained high-temperature and high-pressure fuel gas in a first $CO_2$ waste heat boiler to perform the first supercritical $CO_2$ power generation;

4) purifying the high-pressure fuel gas obtained by the heat exchange in step 3) to obtain the high-pressure purified fuel gas;

5) pumping the remaining part of the high-pressure vaporized oxygen and the high-pressure purified fuel gas jointly into a combustion gas turbine for burning and swelling to drive an air compressor and a generator to generate electricity;

6) subjecting the high-temperature combustion flue gas obtained in step 5) to a heat exchange in a second $CO_2$ waste heat boiler to perform a second supercritical $CO_2$ power generation, and the coolant of the second supercritical $CO_2$ power generation is at least part of the liquid oxygen and/or at least part of the liquid nitrogen;

7) performing heat exchange of the heat exchanged combustion flue gas obtained in step 6) with at least part of the liquid nitrogen through a vaporizer, the vaporization of liquid nitrogen drives a nitrogen turbine generator to generate electricity.

According to the present disclosure, the air separation is preferably a cryogenic air separation, a cascade air separation combined with pressure swing adsorption separation and cryogenic separation or a cascade air separation combined with membrane separation and cryogenic separation. The specific operation of the air separation may be carried out according to the conventional techniques in the art, and the present disclosure does not impose a particular limitation hereto.

At least a part of the pumped liquid oxygen is used for heat exchange and cooling of the supercritical $CO_2$ power generation, at least a part of the liquid oxygen subjects to a heat exchange in a first cooler with the high-temperature $CO_2$ from the first supercritical $CO_2$ generator outlet for the first supercritical $CO_2$ power generation, so as to produce the high-pressure vaporized oxygen and recyclable $CO_2$.

According to the present disclosure, a part of the high-pressure vaporized oxygen is used for gasification of the pulverized coal. Specifically, at least a part of the high-pressure vaporized oxygen and pulverized coal subject to a gasification reaction in a coal gasification furnace to obtain the high-temperature and high-pressure (HTHP) gas. Preferably, the coal gasification furnace of step 3) is an entrained flow bed gasification furnace, a circulating fluidized bed gasification furnace or a staged pyrolysis gasification composite furnace. The conditions of the gasification reaction in the present disclosure are not particularly limited, as long as the pulverized coal can be gasified. Preferably, the pressure of the gasification reaction in step 3) is within a range of 1~10 MPa, and more preferably 2.8~6.4 MPa. In particular, the pulverized coal may be provided by a pulverized coal storage unit, such as a coal bunker.

The HTHP fuel gas is subjected to waste heat recovery in a first $CO_2$ waste heat boiler. Specifically, the HTHP fuel gas subjects to a heat exchange in a first $CO_2$ waste heat boiler to perform first supercritical $CO_2$ power generation. According to the present disclosure, in particular, the process "the HTHP fuel gas subjects to a heat exchange in a first $CO_2$ waste heat boiler to perform first supercritical $CO_2$ power generation" refers to that the supercritical $CO_2$ pressurized by a first $CO_2$ compressor exchanges heat with the HTHP fuel gas in a first $CO_2$ waste heat boiler, and the heat exchanged working medium enters a first supercritical $CO_2$ generator to carry out the first supercritical $CO_2$ power generation.

Each of the first supercritical $CO_2$ power generation and the second supercritical $CO_2$ power generation according to the present disclosure may be independently the variety of power generation modes conventionally used in the art, preferably, the first supercritical $CO_2$ power generation and the second supercritical $CO_2$ power generation are one of a supercritical $CO_2$ power generation mode of a recompression cycle, a segment expansion cycle, a preload cycle, and a partial cooling cycle, respectively.

According to a preferred embodiment of the present disclosure, the first supercritical $CO_2$ power generation according to step 3) comprises: pressurizing the supercritical $CO_2$ with a first $CO_2$ compressor, and then performing heat exchange with the HTHP fuel gas in step 3) in a first $CO_2$ waste heat boiler; the heat exchanged working medium enters the first supercritical $CO_2$ generator for performing the first supercritical $CO_2$ power generation; the high-temperature $CO_2$ from an outlet of the first supercritical $CO_2$ generator subjects to a heat exchange in the first cooler with at least a part of the liquid oxygen, the obtained recyclable $CO_2$ is delivered to the first $CO_2$ compressor.

According to the power generation process provided by the present disclosure, preferably, the supercritical $CO_2$ pressure is within a range of 7~40 MPa, and further preferably, the supercritical $CO_2$ pressure is within a range of 12~25 MPa.

According to the present disclosure, in the step 3), the HTHP fuel gas is subjected to a waste heat recovery in a first $CO_2$ waste heat boiler to obtain the high-pressure fuel gas, which subject to a purification process to prepare a high-pressure purified fuel gas. The present disclosure does not impose a particular limitation on the purification process in step 4), the purification may be carried out in accordance with the conventional technical means in the art. Preferably, the purification in step 4) comprises: subjecting the high-pressure fuel gas to the dust removal, desulfurization, dechlorination and removal of heavy metals so as to prepare the high-pressure purified fuel gas. The specific operations of the dust removal, desulfurization, dechlorination and removal of heavy metals may be implemented according to conventional means in the art.

A part of the high-pressure vaporized oxygen is used for gasification of pulverized coal, and another part of the high-pressure vaporized oxygen and the aforementioned high-pressure purified fuel gas jointly enter a combustion gas turbine for burning and swelling to drive an air compressor and a generator to generate electricity. The specific distribution ratio of the aforementioned high-pressure vaporized oxygen is not particularly limited in the present disclosure, and the skilled person in the art may appropriately distribute and select the ratio according to the specific circumstance.

According to a specific embodiment of the present disclosure, the air inhaled from the outside is compressed to a pressure of 0.4~0.8 MPa by the air compressor in step 5) to obtain the pressurized air with a pressure 0.4~0.8 MPa as described in step 1). The power generation process provided by the present disclosure does not need to pressurize the air to a high-pressure of 2.8 MPa, thereby reduce energy consumption. Specifically, the compressor may be an axial flow compressor, and the air compressor in step 5) inhales air from the external atmospheric environment and stepwise pressurizes the air to a pressure of 0.4~0.8 MPa through the axial flow compressor.

According to the present disclosure, the high-pressure purified gas is subjected to work by the combustion gas turbine to obtain high-temperature combustion flue gas, and the high-temperature combustion flue gas subjects to a heat exchange in the second $CO_2$ waste heat boiler to perform a second supercritical $CO_2$ power generation, wherein the coolant of the second supercritical $CO_2$ power generation is at least part of the liquid oxygen and/or at least part of the liquid nitrogen. That is, when the coolant of the second supercritical $CO_2$ power generation is at least part of the liquid oxygen, a part of the liquid oxygen obtained in step 1) is used as the coolant of the first supercritical $CO_2$ power generation in step 2), the remaining part of the liquid oxygen is used as a coolant of the second supercritical $CO_2$ power generation in step 6); the specific operations of using the remaining part of the liquid oxygen as a coolant of the second supercritical $CO_2$ power generation in step 6) may be as follows: the remaining part of the liquid oxygen performs heat exchange in a second cooler with the high-temperature $CO_2$ from an outlet of the second supercritical $CO_2$ generator; when the coolant of the second supercritical $CO_2$ power generation is at least part of the liquid nitrogen, a part of liquid nitrogen obtained in step 1) is used as a coolant of the second supercritical $CO_2$ power generation, a remaining part of liquid nitrogen is used in step 7), which performs heat exchange through a vaporizer with the heat exchanged combustion flue gas obtained in step 6), the vaporization of liquid nitrogen drives a nitrogen turbine generator to generate electricity. Preferably in step 6), the coolant used for the second supercritical $CO_2$ power generation is at least part of the liquid nitrogen. Preferably, the liquid oxygen obtained in step 1) is completely used in step 2), and it subjects to heat exchange in a first cooler with the high-temperature $CO_2$ from an outlet of the first supercritical $CO_2$ generator.

According to a preferred embodiment of the present disclosure, the second supercritical $CO_2$ power generation in step 6) comprises: pressurizing the supercritical $CO_2$ by a second $CO_2$ compressor, and then performing heat exchange in a second $CO_2$ compressor with the high-temperature combustion flue gas obtained in step 5); pumping the heat exchanged working medium into a second supercritical $CO_2$ generator to carry out the second supercritical $CO_2$ power generation; subjecting the high-temperature $CO_2$ from the second supercritical $CO_2$ generator outlet to a heat exchange in a second cooler with at least part of the liquid nitrogen, the obtained recyclable $CO_2$ is delivered to the second $CO_2$ compressor. Preferably, the supercritical $CO_2$ pressure is within a range of 7~40 MPa, and further preferably, the supercritical $CO_2$ pressure is 12~25 MPa.

The specific proportion of liquid nitrogen obtained in step 1) of the present disclosure is not particularly limited, and the skilled person in the art may appropriately select the ratio according to the practical condition.

According to the present disclosure, the liquid nitrogen obtained in step 1) may be stored during the valley period with low electricity load (e.g., at nighttime), and then during the peak period with high electricity load (e.g., in the daytime), the heat exchange of the heat exchanged combustion flue gas obtained in step 6) with at least part of the liquid nitrogen may be performed through a vaporizer, the vaporization of liquid nitrogen drives a nitrogen turbine generator to generate electricity. The power generation process provided by the present disclosure can perform peak shaving and power generation.

According to a preferred embodiment of the present disclosure, the power generation process further comprises: dehydrating the staged cooled flue gas obtained in step 7), and sending the dehydrated flue gas to a flue gas distillation tower to separate and recover $CO_2$. The staged cooled flue gas refers to the flue gas obtained by means of performing heat exchange (first stage cooling) of the high-temperature combustion flue gas in the second $CO_2$ waste heat boiler, and subjecting the combustion flue gas after the heat exchange to a heat exchange (second stage cooling) by the vaporizer with at least part of the liquid nitrogen. The manner of the dehydration in the present disclosure is not particularly limited, and dehydration may be carried out according to a variety of technical means conventionally used in the art.

According to a preferred embodiment of the present disclosure, at least a part of the recovered $CO_2$ is recycled to the combustion gas turbine in step 5) and enters the combustion gas turbine in conjunction with the high-pressure vaporized oxygen and the high-pressure purified fuel gas. At least a portion of the recovered $CO_2$ is returned to the combustion gas turbine as a feed material for circulation and temperature control.

According to a preferred embodiment of the present disclosure, the mass ratio of the high-pressure vaporized oxygen from an inlet of the combustion gas turbine relative to the recyclable $CO_2$ is 1:(2~12), further preferably 1:(5~8).

According to a preferred embodiment of the present disclosure, at least a part of recovered $CO_2$ is used for replenishing working medium in the first supercritical $CO_2$ power generation in step 3) and/or the second supercritical $CO_2$ power generation in step 6). The present disclosure does not impose a particular limitation on the specific amount of recovered $CO_2$ used in the supercritical $CO_2$ power generation for the replenishment of the working medium, and the skilled person in the art can make a suitable choice according to the specific operation conditions.

The recovered $CO_2$ can also be sold outward as a liquid $CO_2$ product.

According to a specific embodiment of the present disclosure, the integrated coal gasification combined power generation process with zero carbon emission provided by the present disclosure comprises: introducing pressurized air with a pressure 0.4~0.8 MPa into an air separation facility for performing air separation to obtain liquid oxygen and liquid nitrogen; the pumped pressurized liquid oxygen is used for heat exchange, vaporization and power generation; the pumped pressurized liquid nitrogen is used as a coolant to perform heat exchange and used to vaporize and generate electricity; the liquid nitrogen and a part of the liquid oxygen separated at night are stored for use during a peak period with high electricity load at daytime; the pulverized coal transported under pressure from a coal bunker performs a gasification reaction in a coal gasification furnace with at least a part of the high-pressure vaporized oxygen, the obtained high-temperature and high-pressure fuel gas subjects to waste heat recovery through a first $CO_2$ waste heat boiler, and carries out a purification process of dust removal, desulfurization, dechlorination and removal of heavy metals in a purifier, thereby obtain the high-pressure purified fuel gas. The high-temperature supercritical $CO_2$ following a heat exchange by the first $CO_2$ waste heat boiler enters the first supercritical $CO_2$ generator to carry out the first supercritical $CO_2$ power generation, and it is cooled through a heat exchange in the first cooler with at least a part of the liquid oxygen, and is compressed by the first $CO_2$ compressor, and then be delivered to the first $CO_2$ waste heat boiler to perform heat exchange and circulation. The high-pressure purified fuel gas, the remaining part of the high-pressure vaporized oxygen, and the high-pressure recyclable $CO_2$ jointly enter the combustion gas turbine to swell and drive the air compressor and the generator to rotate at a high speed, the air compressor compresses the air to a pressure of 0.4~0.8 MPa (obtaining the pressurized air in step 1) with a pressure of 0.4~0.8 MPa), the generator produces electricity. The obtained high-temperature combustion flue gas is further subjected to heat exchange by a second $CO_2$ waste heat boiler for a second supercritical $CO_2$ power generation, the coolant of the second supercritical $CO_2$ power generation is at least a part of the liquid nitrogen, and the supercritical $CO_2$ following a cooling process is compressed by the second $CO_2$ compressor, and is then transported to the second $CO_2$ waste heat boiler to perform heat exchange and circulation. The combustion flue gas after the heat exchange further performs heat exchange with at least a part of the liquid nitrogen through the vaporizer, vaporization of the liquid nitrogen promotes the nitrogen turbine generator to generate electricity; the flue gas following a staged cooling is dehydrated, the obtained liquid flue gas passes through a distillation tower for separating and recovering $CO_2$, a part of the $CO_2$ is returned to the combustion gas turbine as a feed material for circulation and temperature control, a part of $CO_2$ is used in the supercritical $CO_2$ power generation for replenishing work medium, and a remaining part of $CO_2$ is sold outward as liquid $CO_2$ product. During the peak period of power grid operation with high electricity load during the daytime, the liquid nitrogen stored at nighttime and separated during the daytime is pumped and pressurized, and then subjects to heat exchange and vaporization for power generation; the liquid oxygen stored at nighttime and separated during the daytime is pumped and pressurized, and then subjects to heat exchange and vaporization for use in a coal gasification furnace and a combustion gas turbine to perform peak shaving and power generation in response to the load fluctuation.

The present disclosure will be described in detail below with reference to examples.

Example 1

1) As shown in FIG. 1, the air compressor (13) inhales air from the outside atmospheric environment and pressurizes the air to a pressure of 0.4~0.8 MPa; the pressurized air with a pressure of 0.4~0.8 MPa enters an air separation facility (1) for performing air separation to obtain liquid oxygen and liquid nitrogen;
2) the liquid oxygen is used for the first supercritical $CO_2$ heat exchange, specifically, the liquid oxygen and the high-temperature $CO_2$ from an outlet of a first supercritical $CO_2$ generator (5) for carrying out the first supercritical $CO_2$ power generation perform heat exchange in a first cooler (6), thereby obtain high-pressure vaporized oxygen and recyclable $CO_2$, the coolant in the first cooler (6) is liquid oxygen;
3) at least a part of the high-pressure vaporized oxygen and the pulverized coal provided by the coal bunker (2) are subjected to a gasification reaction in a coal gasification furnace (3) (pressure within a range of 1~10 MPa), and the obtained high-temperature and high-pressure (HTHP) fuel gas performs heat exchange in the first $CO_2$ waste heat boiler (4) in order to perform the first supercritical $CO_2$ power generation, the first supercritical $CO_2$ power generation comprising: pressurizing the supercritical $CO_2$ with a first $CO_2$ compressor (7), and then performing heat exchange in a first $CO_2$ waste heat boiler (4) with the HTHP fuel gas; the heat exchanged working medium enters the first supercritical $CO_2$ generator (5) for performing the first supercritical $CO_2$ power generation; the high-temperature $CO_2$ from an outlet of the first supercritical $CO_2$ generator (5) subjects to a heat exchange in the first cooler (6) with the liquid oxygen, the obtained recyclable $CO_2$ is delivered to the first $CO_2$ compressor (7), and the supercritical $CO_2$ pressure is within a range of 7~40 MPa;
4) the high-pressure fuel gas obtained by the heat exchange in step 3) is subjected to a purification process of dust removal, desulfuration, dechlorination and removal of heavy metals in a purifier (8) to obtain high-pressure purified fuel gas;
5) the remaining part of the high-pressure vaporized oxygen, the high-pressure purified fuel gas and the recyclable $CO_2$ jointly enter the combustion gas turbine (9) for burning and swelling to drive the air compressor (13) and the generator (18) to rotate at a high speed, the air compressor (13) compresses the air to a pressure of 0.4~0.8 MPa (to obtain the pressurized air in step 1) with a pressure of 0.4~0.8 MPa), the generator (18) generates electricity, and the mass ratio of the high-pressure vaporized oxygen from an inlet of the combustion gas turbine (9) relative to the recyclable $CO_2$ is 1:(2~12);
6) the high-temperature combustion flue gas obtained in step 5) is subjected to heat exchange in a second $CO_2$ waste heat boiler (14) to perform a second supercritical $CO_2$ power generation, and a coolant of the second supercritical $CO_2$ power generation is at least a part of the liquid nitrogen; the second supercritical $CO_2$ power generation comprises: pressurizing the supercritical $CO_2$ with a second $CO_2$ compressor (17), and then performing heat exchange in a second $CO_2$ waste heat boiler (14) with the high-temperature combustion flue gas obtained in step 5); the heat exchanged working medium enters the second supercritical $CO_2$ generator (15) for performing the second supercritical $CO_2$ power generation; the high-temperature $CO_2$ from an outlet of the first supercritical $CO_2$ generator (5) subjects to a heat exchange in the second cooler (16) with at least a part of the liquid nitrogen, the obtained recyclable $CO_2$ is delivered to the second $CO_2$ compressor (17), and the supercritical $CO_2$ pressure is within a range of 7~40 MPa;
7) the heat exchanged combustion flue gas obtained in step 6) is subjected to heat exchange with the remaining part of liquid nitrogen through a vaporizer (10), the vaporization of the liquid nitrogen drives a nitrogen turbine generator (11) to generate electricity.

The staged cooled flue gas is dehydrated, and the dehydrated liquid flue gas is sent to the flue gas distillation tower (12) for separating and recovering $CO_2$, a part of the recovered $CO_2$ is returned to the combustion gas turbine (9) as a feed material for circulation and temperature control, a part of the recovered $CO_2$ is used for replenishing working medium of the supercritical $CO_2$ power generation, and a remaining part of the recovered $CO_2$ is sold outward as a liquid $CO_2$ product.

The liquid nitrogen and a part of the liquid oxygen obtained from air separation may be stored during the valley period with low electricity load (e.g., at nighttime) so as to be supplied in use during the peak period with high electricity load in the daytime. Specifically, during the peak period of power grid operation with high electricity load (e.g., the daytime), the liquid nitrogen stored at nighttime and separated during the daytime may be pumped and pressurized, and then subjects to heat exchange and vaporization in a vaporizer (10) for power generation; the liquid oxygen stored at nighttime and separated during the daytime is pumped and pressurized, and then subjects to heat exchange and vaporization for use in a coal gasification furnace (3) and a combustion gas turbine (9) to perform peak shaving and power generation in response to the load fluctuation.

The integrated coal gasification combined power generation process with zero carbon emission provided by the present disclosure can be used for shaving peak and generating electricity. According to an Aspen simulation result, the power generation process provided by the present disclosure uses an air separation facility to pump and pressurize the liquid oxygen and liquid nitrogen with a low energy consumption, the pressure of the air compressor is reduced from the current level of about 2.8 MPa to 0.4~0.8 MPa, which makes the energy consumption ratio of the combustion gas turbine for the air compressor is reduced from 30%~40% to around 10%; the high-temperature and high-pressure fuel gas from the gasification of pulverized coal first utilizes the supercritical $CO_2$ to perform heat exchange and power generation, and then subjects to purification and sends to a combustion gas turbine for power generation, such the arrangement may reasonably and stepwise utilize the sensible heat and chemical energy of the fuel gas, thereby reduce the cycle ratio of high-pressure $CO_2$ and the difficulty of gas purification, improve the power generation efficiency of the fuel gas; the flue gas uses supercritical $CO_2$ power generation, the vaporization of liquid nitrogen and power generation by a nitrogen turbine generator to form the IGCC system, the temperature of exhaust flue gas is lowered from about 140° C. in the prior art to about 30° C., the energy recovery rate is greatly improved, the flue gas can be easily dehydrated and separated to obtain $CO_2$, and the energy consumption of $CO_2$ capture is significantly reduced; the water consumption of this process is greatly reduced due to the $CO_2$ circulation and temperature control of the combustion gas turbine, the supercritical $CO_2$ is applied as a work medium of waste heat power generation, the dehydration of flue gas at a low temperature and a recyclable utilization of the dehydrated water, in combination with coal gasification and dry slagging, the water-saving rate will be as high as 95%, the process is especially suitable for water-deficient areas; in addition, the high-pressure fuel gas is subjected to a precise purification process of dust removal, desulfurization, dechlorination and removal of heavy metals in advance, the combustion gas turbine uses oxygen to aid combustion, and the $CO_2$ subjects to circulation and temperature control, it avoids an emission of the $NO_x$ in the flue gas from the existing coal-fired power plants, greatly reduces the emission of smoke dust and SOx, and achieves clean power generation of the coal; moreover, the air separation components are separately utilized, the liquid nitrogen is used for energy storage and peak shaving, the demand of gas storage volume is greatly reduced, the air storage energy consumption is reduced by more than 20 times, the energy storage efficiency is high, which satisfies the demand of the peak shaving and valley filling of the IGCC basic load power plant in the future.

The above content describes in detail the preferred embodiments of the present disclosure, but the present disclosure is not limited thereto. A variety of simple modifications can be made to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. An integrated coal gasification combined power generation process with zero carbon emission, the process comprising:
   1) introducing pressurized air with a pressure 0.4 to 0.8 MPa into an air separation facility for performing air separation to obtain liquid oxygen and liquid nitrogen;
   2) performing heat exchange at a first cooler between at least a part of the liquid oxygen and high-temperature $CO_2$ from an outlet of a first supercritical $CO_2$ generator, so as to generate high-pressure vaporized oxygen and recyclable $CO_2$;
   3) subjecting at least a part of the high-pressure vaporized oxygen and pulverized coal to a gasification reaction in a coal gasification furnace to obtain a high-temperature and high pressure fuel gas, carrying out heat exchange of the high-temperature and high-pressure fuel gas in a first $CO_2$ waste heat boiler to perform a first supercritical $CO_2$ power generation;
   4) purifying high-pressure fuel gas obtained by the heat exchange in step 3) to obtain high-pressure purified fuel gas;
   5) pumping the high-pressure vaporized oxygen remaining after step 3) and the high-pressure purified fuel gas jointly into a combustion gas turbine for burning and swelling to drive an air compressor and a generator to generate electricity and to obtain a high-temperature combustion flue gas;
   6) subjecting the high-temperature combustion flue gas obtained in step 5) to heat exchange in a second $CO_2$ waste heat boiler to perform a second supercritical $CO_2$ power generation, and coolant of the second supercritical $CO_2$ power generation is at least part of the liquid oxygen and/or at least part of the liquid nitrogen;
   7) performing heat exchange of heat exchanged combustion flue gas obtained in step 6) with at least part of the liquid nitrogen through a vaporizer to obtain a staged cooled flue gas, wherein the vaporization of liquid nitrogen drives a nitrogen turbine generator to generate electricity.

2. The integrated coal gasification combined power generation process with zero carbon emission according to claim 1, wherein the power generation process further comprises: dehydrating the staged cooled flue gas obtained in step 7), and sending the dehydrated flue gas to a flue gas distillation tower to separate and recover $CO_2$.

3. The integrated coal gasification combined power generation process with zero carbon emission according to claim 2, wherein at least a part of the recovered $CO_2$ is recycled to the step 5) and enters the combustion gas turbine in conjunction with the high-pressure vaporized oxygen and the high-pressure purified fuel gas.

4. The integrated coal gasification combined power generation process with zero carbon emission according to claim 3, wherein the mass ratio of the high-pressure vaporized oxygen from an inlet of the combustion gas turbine relative to the recyclable $CO_2$ is 1:2 to 1:12.

5. The integrated coal gasification combined power generation process with zero carbon emission according to claim 4, wherein the mass ratio of the high-pressure vaporized oxygen from an inlet of the combustion gas turbine relative to the recyclable $CO_2$ is 1:5 to 1:8.

6. The integrated coal gasification combined power generation process with zero carbon emission according to claim 2, wherein at least a part of recovered $CO_2$ is used for replenishing working medium in the first supercritical $CO_2$ power generation in step 3) and/or the second supercritical $CO_2$ power generation in step 6).

7. The integrated coal gasification combined power generation process with zero carbon emission according to claim 1, wherein the air separation is a cryogenic air separation, a cascade air separation combined with pressure swing adsorption separation and cryogenic separation or a cascade air separation combined with membrane separation and cryogenic separation.

8. The integrated coal gasification combined power generation process with zero carbon emission according to claim 1, wherein the first supercritical $CO_2$ power generation and the second supercritical $CO_2$ power generation are one of a supercritical $CO_2$ power generation mode of a recompression cycle, a segment expansion cycle, a preload cycle, and a partial cooling cycle, respectively.

9. The integrated coal gasification combined power generation process with zero carbon emission according to claim 1, wherein the first supercritical $CO_2$ power generation according to step 3) comprises: pressurizing supercritical $CO_2$ with a first $CO_2$ compressor, and then performing heat exchange with the high-temperature and high-pressure fuel gas in step 3) in a first $CO_2$ waste heat boiler to form a heat exchanged working medium; the heat exchanged working medium enters the first supercritical $CO_2$ generator for performing the first supercritical $CO_2$ power generation; high-temperature $CO_2$ from an outlet of the first supercritical $CO_2$ generator subjects to a heat exchange in the first cooler with a part of the liquid oxygen, the recyclable $CO_2$ is delivered to the first $CO_2$ compressor; the supercritical $CO_2$ pressure is within a range of 7 to 40 MPa.

10. The integrated coal gasification combined power generation process with zero carbon emission according to claim 1, wherein the second supercritical $CO_2$ power generation in step 6) comprises: pressurizing the supercritical $CO_2$ by a second $CO_2$ compressor, and then performing heat exchange in the second $CO_2$ compressor with the high-temperature combustion flue gas obtained in step 5) to form a heat exchanged working medium; pumping the heat exchanged working medium into a second supercritical $CO_2$ generator to carry out the second supercritical $CO_2$ power generation; subjecting the high-temperature $CO_2$ from an outlet of the second supercritical $CO_2$ generator to a heat exchange in a second cooler with at least part of the liquid nitrogen to form recyclable $CO_2$, the recyclable $CO_2$ is delivered to the second $CO_2$ compressor; the supercritical $CO_2$ pressure is within a range of 7 to 40 MPa.

11. The integrated coal gasification combined power generation process with zero carbon emission according to claim 1, wherein the coal gasification furnace of step 3) is an entrained flow bed gasification furnace, a circulating fluidized bed gasification furnace or a staged pyrolysis gasification composite furnace.

12. The integrated coal gasification combined power generation process with zero carbon emission according to claim 1, wherein the pressure of the gasification reaction in step 3) is within a range of 1 to 10 MPa.

13. The integrated coal gasification combined power generation process with zero carbon emission according to claim 1, wherein the purification in step 4) comprises: subjecting the high-pressure fuel gas to dust removal, desulfurization, dechlorination and removal of heavy metals so as to prepare the high-pressure purified fuel gas.

14. The integrated coal gasification combined power generation process with zero carbon emission according to claim 1, wherein the air inhaled from the outside is compressed to a pressure of 0.4 to 0.8 MPa by the air compressor in step 5) to obtain the pressurized air with a pressure 0.4 to 0.8 MPa as described in step 1).

* * * * *